United States Patent
Duan et al.

(10) Patent No.: US 10,638,429 B2
(45) Date of Patent: Apr. 28, 2020

(54) TERMINAL DEVICE WITH A POWER SUPPLY CONTROL DURING EMERGENCY COMMUNICATION

(71) Applicant: Huawei Technologies Co., Ltd., Shenzhen (CN)

(72) Inventors: Weifeng Duan, Shenzhen (CN); Qingyin Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/043,787

(22) Filed: Jul. 24, 2018

(65) Prior Publication Data

US 2018/0332538 A1    Nov. 15, 2018

Related U.S. Application Data

(63) Continuation of application No. PCT/CN2016/090004, filed on Jul. 14, 2016.

(30) Foreign Application Priority Data

Jan. 25, 2016    (CN) .......................... 2016 1 0049135

(51) Int. Cl.
*H04W 52/02*    (2009.01)
*H02J 9/02*    (2006.01)
(Continued)

(52) U.S. Cl.
CPC .......... *H04W 52/0296* (2013.01); *G06F 1/32* (2013.01); *H02J 9/02* (2013.01); *H02J 9/061* (2013.01);
(Continued)

(58) Field of Classification Search
CPC ... H04W 52/00; H04W 52/02; H04W 52/028; H04W 52/0212; H04W 52/0258;
(Continued)

(56) References Cited

U.S. PATENT DOCUMENTS 7,266,396 B2    9/2007  Terzian et al.
2007/0243852 A1*  10/2007  Gibbs ............... H04W 52/0264
                                                       455/343.5
(Continued)

FOREIGN PATENT DOCUMENTS

CN    1673913 A    9/2005
CN    101515962 A    8/2009
(Continued)

OTHER PUBLICATIONS

Machine Translation and Abstract of Chinese Publication No. CN10595829, Feb. 19, 2014, 6 pages.
(Continued)

*Primary Examiner* — Michael Y Mapa
(74) *Attorney, Agent, or Firm* — Conley Rose, P.C.

(57) ABSTRACT

A terminal device, where a processor of the terminal device is configured to control an energy storage device to supply power to a first functional circuit group and a second functional circuit group when the processor determines that the terminal device enters a first state, and when the processor determines that the terminal device enters a second state, the processor is further configured to start an emergency power supply to supply power to the first functional circuit group. Power supply modes in different modes are used such that the terminal device can be adapted to a plurality of working occasions, and it is ensured that the device supplies power to the first functional circuit group in an emergency, thereby meeting a use requirement of a user.

20 Claims, 2 Drawing Sheets

(51) Int. Cl.

| | | |
|---|---|---|
| *H02J 9/06* | (2006.01) | |
| *G06F 1/32* | (2019.01) | |
| *H04W 88/02* | (2009.01) | |
| *G06F 1/3231* | (2019.01) | |
| *G06F 1/3234* | (2019.01) | |
| *G06F 1/3287* | (2019.01) | |
| *G06F 1/3212* | (2019.01) | |
| *G06F 1/26* | (2006.01) | |
| *H02J 9/00* | (2006.01) | |
| *H02J 7/32* | (2006.01) | |

(52) U.S. Cl.
CPC .......... *H02J 9/062* (2013.01); *H04W 52/028* (2013.01); *H04W 52/0277* (2013.01); *H04W 88/02* (2013.01)

(58) Field of Classification Search
CPC ......... H04W 52/0277; H04W 52/0296; H04W 68/005; H04W 72/0493; H04W 84/12; H04W 88/02; H04L 43/16; H02J 9/061; H02J 7/32; H02J 9/002; H02J 9/02; H02J 9/062; G06F 1/32; G06F 1/3203; G06F 1/3212; G06F 1/263; G06F 1/3231; G06F 1/3265; G06F 1/3287; Y02B 60/12; Y02B 60/1278; Y02B 60/1292; Y02B 60/40; Y02B 60/50
USPC ................. 455/13.4, 343.1–343.6, 405, 522, 455/571–574; 370/311; 713/300, 713/320–321
See application file for complete search history.

(56) References Cited

U.S. PATENT DOCUMENTS

| | | | | |
|---|---|---|---|---|
| 2008/0057894 | A1* | 3/2008 | Aleksic | H02J 9/002 455/187.1 |
| 2008/0084117 | A1* | 4/2008 | Sander | H02J 7/35 307/46 |
| 2010/0124896 | A1* | 5/2010 | Kumar | H04B 1/1607 455/404.1 |
| 2010/0240417 | A1* | 9/2010 | Wickman | H04W 52/027 455/566 |
| 2013/0038126 | A1 | 2/2013 | Wang et al. | |
| 2013/0328401 | A1* | 12/2013 | Chen | H02J 9/061 307/64 |
| 2014/0269470 | A1* | 9/2014 | Hybertson | H04W 52/0225 370/311 |
| 2014/0378853 | A1 | 12/2014 | McKinney et al. | |
| 2016/0100369 | A1* | 4/2016 | Chhabra | H04W 52/0274 370/311 |
| 2018/0247172 | A1 | 8/2018 | Fang et al. | |

FOREIGN PATENT DOCUMENTS

| | | |
|---|---|---|
| CN | 201937694 U | 8/2011 |
| CN | 102647050 A | 8/2012 |
| CN | 103326456 A | 9/2013 |
| CN | 103546649 A | 1/2014 |
| CN | 103595829 A | 2/2014 |
| CN | 101873082 B | 8/2014 |
| CN | 104348949 A | 2/2015 |
| CN | 104377399 A | 2/2015 |
| CN | 104618610 A | 5/2015 |
| CN | 105244964 A | 1/2016 |
| WO | 2007014368 A2 | 2/2007 |

OTHER PUBLICATIONS

Machine Translation and Abstract of Chinese Publication No. CN104348949, Feb. 11, 2015, 19 pages.
Foreign Communication From a Counterpart Application, Chinese Application No. 201610049135.6, Chinese Office Action dated Dec. 29, 2018, 6 pages.
Machine Translation and Abstract of Chinese Publication No. CN1673913, Sep. 28, 2005, 10 pages.
Machine Translation and Abstract of Chinese Publication No. CN101515962, Aug. 26, 2009, 9 pages.
Machine Translation and Abstract of Chinese Publication No. CN101873082, Oct. 27, 2010, 12 pages.
Machine Translation and Abstract of Chinese Publication No. CN102647050, Aug. 22, 2012, 5 pages.
Machine Translation and Abstract of Chinese Publication No. CN103326456, Sep. 25, 2013, 10 pages.
Machine Translation and Abstract of Chinese Publication No. CN103546649, Jan. 29, 2014, 13 pages.
Machine Translation and Abstract of Chinese Publication No. CN103595829, Feb. 19, 2014, 6 pages.
Machine Translation and Abstract of Chinese Publication No. CN104377399, Feb. 25, 2015, 9 pages.
Machine Translation and Abstract of Chinese Publication No. CN104618610, May 13, 2015, 8 pages.
Machine Translation and Abstract of Chinese Publication No. CN201937694, Aug. 17, 2011, 5 pages.
Foreign Communication From a Counterpart Application, PCT Application No. PCT/CN2016/090004, English Translation of International Search Report dated Oct. 31, 2016, 2 pages.
Foreign Communication From a Counterpart Application, PCT Application No. PCT/CN2016/090004, English Translation of Written Opinion dated Oct. 31, 2016, 5 pages.

* cited by examiner

TERMINAL DEVICE WITH A POWER SUPPLY CONTROL DURING EMERGENCY COMMUNICATION

CROSS-REFERENCE TO RELATED APPLICATIONS

This application is a continuation of International Patent Application No. PCT/CN2016/090004 filed on Jul. 14, 2016, which claims priority to Chinese Patent Application No. 201610049135.6 filed on Jan. 25, 2016. Both of the aforementioned applications are hereby incorporated by reference in their entireties.

TECHNICAL FIELD

The present disclosure relates to the field of intelligent terminals, and in particular, to a terminal device.

BACKGROUND

With rapid development of smartphones, more functions are integrated, mobile phones have increasingly large screens, processors are gradually enhanced, and consequently, larger power consumption is caused. Mobile phones are inseparable from people's daily life styles and have become a requisite transportation of people.

Power to existing mobile phones is generally supplied using batteries, or auxiliary power supply is performed using portable charging devices in order to satisfy use of elementary functions of the mobile phones. However, although some requirements can be met in the foregoing manner, people still gradually find some disadvantages in a use process. The mobile phones cannot be normally used in special occasions, causing inconvenience to people's life, and are even difficult to play a role of the mobile phones in convenient communication at critical moments, leading to a significant loss of people's life, properties, and even lives.

During phone communication, if a mobile phone is suddenly out of power, which cannot be foreseen by people, the mobile phone is suddenly powered off in a call process and cannot be switched on when a call is required in an emergency. Particularly, when charge is inconvenient in remote areas, people are at a loss and inconvenience is caused to life.

SUMMARY

In view of this, embodiments of the present disclosure provide a terminal device.

The terminal device in the embodiments of the present disclosure includes a control unit, a first functional unit group, a second functional unit group, an energy storage unit, and an emergency power supply unit. The control unit is connected to the first functional unit group, the second functional unit group, the energy storage unit, and the emergency power supply unit. The first functional unit group is configured to implement a mobile communication function of the terminal device, the second functional unit group is configured to implement a non-mobile communication function of the terminal device, and the control unit is configured to determine whether the terminal device is in a first state or a second state. The first state is that an electricity quantity of the energy storage unit is not less than a power-supply threshold and the energy storage unit is capable of supplying power to the device, and the second state is that the electricity quantity of the energy storage unit is less than the power-supply threshold and the energy storage unit is incapable of supplying power to the device. When the control unit determines that the terminal device enters the first state, the control unit is configured to control the energy storage unit to supply power to the first functional unit group and the second functional unit group, or when the control unit determines that the terminal device enters the second state, the control unit is configured to start the emergency power supply unit to supply power to the first functional unit group. Power supply modes in different modes are used such that the device can be adapted to a plurality of working occasions. When the energy storage unit cannot supply power, the emergency power supply unit is used for power supply, in addition, the control unit flexibly supplies power to the first functional unit group and the second functional unit group such that it is ensured that the device preferentially supplies power to the first functional unit group in an emergency, thereby meeting a use requirement of a user.

The first functional unit group includes at least one or more of a communications module, a sensor module, a Global Positioning System (GPS) module, a display module, and a key module. During emergency communication, the first functional unit group needs to remain in a power supply state to implement an emergency communication function. The second functional unit group includes at least one or more of a BLUETOOTH low energy (BLE) module and a WI-FI module. During emergency communication, limited electric energy is preferentially supplied to the first functional unit group for use. A low power consumption operation is performed on a component in the second functional unit group, and low power consumption may be a standby state or a shutdown state.

It should be noted that, for that a first functional unit includes at least one or more of a communications module, a sensor module, a GPS module, a display module, and a key module, the first functional unit group is configured to implement a basic communication function only in order to reduce additional electric energy consumption in an emergency and ensure performing of emergency communication, for that a second functional unit includes at least one or more of a BLE module and a WI-FI module, a module divided into the second functional unit group may be selected according to a requirement. Power may not be supplied to a functional unit not used during emergency communication such that the limited electric energy can be supplied to the emergency communication as much as possible.

The emergency power supply unit includes a power generation module and a power conversion module. The power conversion module is electrically connected to the power generation module, the power generation module is configured to generate electric energy, and the power conversion module is configured to convert the electric energy generated by the power generation module into a working voltage of the device.

A voltage-transformation and power-switching unit is disposed between the control unit and the energy storage unit, and the voltage-transformation and power-switching unit is electrically connected to the power conversion module. When the control unit determines that the terminal device enters the first state, the control unit controls the voltage-transformation and power-switching unit to switch on the energy storage unit and switch off the power conversion module, to disconnect a branch in which the emergency power supply unit is located, or when the control unit determines that the terminal device enters the second state, the control unit controls the voltage-transformation and power-switching unit to switch off the energy storage unit and switch on the power conversion module.

The power generation module includes at least one or more of a solar cell panel component, a vibration power-generating component, a friction power-generating component, and a thermal-energy component, and may convert energy of another form into electric energy, to provide electric energy assurance during emergency communication.

To help to supply stable electric energy to the terminal device, the power conversion module includes an electric energy cache unit, the electric energy cache unit is electrically connected to the voltage-transformation and power-switching unit, and the electric energy cache unit is configured to cache the electric energy generated by the power generation module. For example, the electric energy cache unit may use a capacitor. This is not limited herein.

To better save electric energy, when the control unit determines that the terminal device enters the second state, the control unit is further configured to control the second functional unit group to enter a low power consumption state. The low power consumption state includes a standby state or a turn-off state.

The power-supply threshold is used as a limit for distinguishing between the first state and the second state. When the electricity quantity of the energy storage unit is less than the power-supply threshold, it may be considered that electric energy in the energy storage unit is insufficient to be supplied to the terminal device for normal use, and the power-supply threshold may be set to a lowest electricity quantity required for maintaining work of the device.

The terminal device provided in the present disclosure may be a smartphone, a tablet computer, or a wearable device, provided that the mobile communication function can be provided. This is not limited herein.

The embodiments of the present disclosure disclose a terminal device. Power supply modes in different modes are used such that the device can be adapted to a plurality of working occasions. When the energy storage unit cannot supply power, the emergency power supply unit is used for power supply, in addition, the control unit flexibly supplies power to the first functional unit group and the second functional unit group such that it is ensured that the device preferentially supplies power to the first functional unit group in an emergency, thereby meeting an emergency communication requirement of a user.

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall in the protection scope of the present disclosure.

In the specification, claims, and accompanying drawings of the present disclosure, the terms "first," "second," "third," "fourth," and so on are intended to distinguish between similar objects but do not necessarily indicate a specific order or sequence. It should be understood that data termed in such a way are interchangeable in proper circumstances so that the embodiments of the present disclosure described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Usually, when an electronic device is used, a case in which the device has a low electricity quantity or is out of power often occurs. In this case, people may charge the electric device using an external mobile power supply or a charger. However, sometimes, the mobile power supply or charger is unavailable to be used by people to charge the electronic device. For example, in a field environment, a common method is that when the electronic device has a low electricity quantity, the electronic device may enter a limit power supply mode, and a general packet radio service (GPRS) network is switched off and/or display luminance of a screen is reduced. However, these reduce electricity quantity consumption in terms of software only, and energy consumption is not completely reduced.

Figure 1:
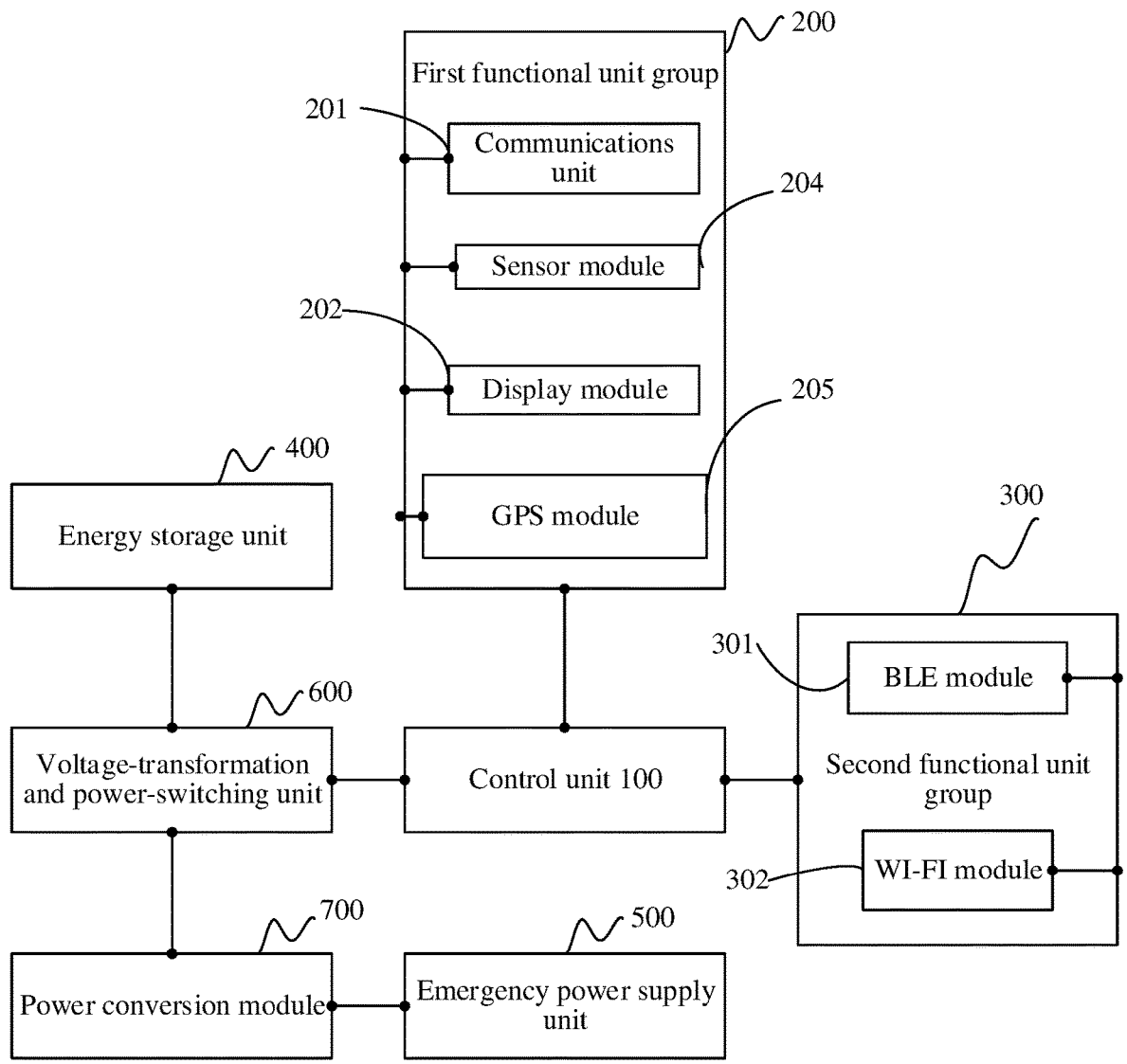
FIG. 1 is a structural diagram of an embodiment of a terminal device according to the present disclosure.

With reference to FIG. 1, the present disclosure provides a terminal device. The terminal device includes a control unit 100, a first functional unit group 200, a second functional unit group 300, an energy storage unit 400, and an emergency power supply unit 500.

The terminal device herein may be a mobile phone or a tablet computer, and is a device that can perform a mobile communication function.

The control unit 100 may include a processor (e.g. Central Processing Unit (CPU)) or a micro control unit (MCU), and is configured to control an electronic component in the terminal device.

The first functional unit group 200 is electrically connected to the control unit 100 and is configured to implement a mobile communication function of the terminal device, and includes a plurality of first functional units.

The first functional unit group 200 herein is a set of functional units required for implementing the communication function of the terminal device. The communication function is an original intention of using the terminal device by a user. When there is a low electricity quantity, the mobile communication function is preferentially provided for the user. For example, when the terminal device is a mobile phone, an elementary function implemented by the first functional unit group 200 may be correspondingly a mobile call function. Functional units required for implementing the elementary function all need to be divided into the first functional unit group 200. For example, when the mobile communication function is implemented, the first functional unit group 200 may include a communications unit 201, a display module 202, a key module (not shown), and the like. Certainly, the first functional unit group 200 may further include a sensor module 204, and a GPS module 205. Flexible selection may be performed based on a functional unit required by the mobile communication function. This is not limited herein.

The second functional unit group 300 is electrically connected to the control unit 100 and is configured to implement a non-mobile communication function, enters a low power consumption state when the terminal device is in a second state, and includes a plurality of second functional units.

In addition to a BLE module 301 and the WI-FI module 302, the second functional unit group 300 may further include a functional unit, for example, a gravity sensor module or a gyroscope, corresponding to another additional function. The functional unit may be flexibly selected, and this is not limited herein.

A first state may be understood as that the terminal device has a sufficient electricity quantity, that is, the energy storage unit 400 has a sufficient electricity quantity to supply power to the device. In this case, there is no need to worry about a problem that an emergency call is unavailable due to an insufficient electricity quantity. The second state may be understood as that the energy storage unit 400 in the terminal device has a low electricity quantity or the terminal cannot be switched on for use. In this case, if an emergency call is required, a problem inevitably can be resolved only by relying on the electricity quantity of the energy storage unit 400. Optionally, the first state is that the electricity quantity of the energy storage unit 400 is not less than a power-supply threshold. The second state is that the electricity quantity of the energy storage unit 400 is less than the power-supply threshold. In this case, the energy storage unit 400 cannot supply power to the device. This is not limited herein.

The non-communication function herein is an additional function of the terminal device other than the communication function such that the terminal device can better provide a service for the user. When there is a low electricity quantity, a functional unit corresponding to the additional function may be standby or switched off. There may be many additional functions. Therefore, functional units corresponding to the additional functions may form the second functional unit group 300 to facilitate uniform control. For example, when the terminal device is a mobile phone, in addition to provide the necessary mobile communication function, there may further be a BLUETOOTH short range communication function or a WI-FI network access function. These functions need to send a signal out. This consumes a particular electricity quantity. When there is a low electricity quantity and an emergency call is required, the BLUETOOTH function or the WI-FI function may not be required and only the mobile communication function is required. In this case, the BLUETOOTH function or the WI-FI function may be standby or run with low power consumption.

The energy storage unit 400 is electrically connected to the control unit 100, and is configured to supply electric energy to the terminal device when the terminal device is in the first state.

The energy storage unit 400 may be a storage battery such as a lithium battery or a lead-acid battery, and may store the electricity quantity for use by the terminal device. This is not limited herein.

The control unit 100 is configured to determine whether the terminal device is in the first state or the second state. The first state is that the electricity quantity of the energy storage unit 400 is not less than the power-supply threshold, and the second state is that the electricity quantity of the energy storage unit 400 is less than the power-supply threshold and the energy storage unit 400 is incapable of supplying power to the device.

When the control unit 100 determines that the terminal device enters the first state, the control unit 100 controls the energy storage unit 400 to supply power to the first functional unit group 200 and the second functional unit group 300.

When the control unit 100 determines that the terminal device enters the second state, the control unit 100 controls the emergency power supply unit 500 to supply power to the first functional unit group 200. When the terminal device enters the second state, the second functional unit group 300 may further enter the low power consumption state, for example, enter a standby or shutdown state in order to ensure normal performing of emergency communication.

Optionally, a voltage-transformation and power-switching unit 600 is disposed between the control unit 100 and the energy storage unit 400. The voltage-transformation and power-switching unit 600 is electrically connected to a power conversion module 700. The voltage-transformation and power-switching unit 600 is configured to switch on the energy storage unit 400 and switch off the power conversion module 700 based on a first instruction of the control unit 100 when the terminal device is in the first state, and switch off the energy storage unit 400 and switch on the power conversion module 700 based on a second instruction of the control unit 100 when the terminal device is in the second state. Further, when the control unit 100 determines that the terminal device enters the first state, the control unit 100 controls the voltage-transformation and power-switching unit 600 to switch on the energy storage unit 400 and switch off the power conversion module 700 to disconnect a branch in which the emergency power supply unit 500 is located. When the control unit 100 determines that the terminal device enters the second state, the control unit 100 controls the voltage-transformation and power-switching unit 600 to switch off the energy storage unit 400 and switch on the power conversion module 700. In this way, power switching can be flexibly performed.

A current output by the energy storage unit 400 may be converted using the voltage-transformation and power-switching unit 600 to adjust an output voltage of a battery, and ensure that the current is output to supply power to each module of the terminal device. In addition, when the terminal device enters the second state, when the emergency power supply unit 500 supplies power to the terminal device, the voltage-transformation and power-switching unit 600 needs to disconnect a branch of the energy storage unit 400 to prevent a current sent by the emergency power supply unit 500 from charging the energy storage unit 400. A battery capacity of the energy storage unit 400 is far greater than the current sent by the emergency power supply unit 500, and consequently, not only the current cannot be charged into the energy storage unit 400, but also electric energy is wasted. Therefore, in the second state, the branch of the energy storage unit 400 may be disconnected when the emergency power supply unit 500 works in order to reduce electricity quantity consumption.

The emergency power supply unit 500 is electrically connected to the control unit 100, and is configured to supply electric energy to the terminal device when the terminal device is in the second state.

The emergency power supply unit 500 may perform emergency power supply on the terminal device when the energy storage unit 400 has a low electricity quantity or has no electricity quantity. After the electricity quantity of the energy storage unit 400 is supplemented, the emergency power supply unit 500 may not be required for power supply.

Optionally, the power conversion module 700 includes an electric energy cache unit (not shown) configured to cache electric energy generated by the power generation module, and the electric energy cache unit is electrically connected to the voltage-transformation and power-switching unit 600.

The electric energy cache unit herein is used to ensure stability of a converted voltage, the electric energy cache unit may use a capacitor, and the capacitor is preferably a supercapacitor and can store more electricity quantity.

When the terminal device enters the first state, the control unit 100 controls the energy storage unit 400 to supply power to the first functional unit group 200, the second functional unit group 300, and the communications unit 201.

When the terminal device enters the second state, the control unit 100 controls the energy storage unit 400 to be switched off, controls the emergency power supply unit 500 to supply power to the first functional unit group 200, and controls the second functional unit group 300 to enter the low power consumption state. The low power consumption state includes a standby state or a turn-off state.

Optionally, the power generation module includes at least one of a solar cell panel component, a vibration power-generating component, a friction power-generating component, or a thermal-energy component. Certainly, another power generating component may be selected, provided that emergency power generation can be performed. This is not limited.

The friction power-generating component may be disposed on a display screen of the terminal device, or may be disposed on a back facet of the terminal device. When emergency power supply is required, the user performs reciprocal friction on the friction power-generating component for power generation. A current generated by the friction power-generating component passes through the electric energy cache unit in the power conversion module 700, and the electric energy cache unit performs stable adjustment on the current and then supplies power to the terminal device.

The vibration power-generating component is disposed on the terminal device. The user shakes the terminal device to enable the vibration power-generating component to generate power to convert mechanical energy into electric energy for use by the device.

The solar cell panel component may convert solar energy into electric energy for use by the terminal device. A solar panel herein may use a monocrystalline silicon solar panel, a polycrystalline silicon solar panel, an amorphous silicon solar panel, and a polycompound solar panel. Flexible selection may be performed during application, and this is not limited herein.

The thermal-energy component may store solar heat for power generation, and convert solar energy into thermal energy for use by the device.

An emergency power-generating unit may have another power generation form. For example, a hand-operated power-generating component may be used, and kinetic energy generated during shaking is used such that an internal precise and mini-sized motor operates at a high speed to generate electric energy. This is not limited.

Optionally, the device may include any terminal device such as a mobile phone, a tablet computer, a personal digital assistant (PDA), a point of sale (POS), a vehicle-mounted computer, and a wearable device. The wearable device may be a smart band, a smartwatch, smart glasses, and the like.

For switching between the first state and the second state of the terminal device, two manners may be used.

1. Automatic Switching

The terminal device detects a remaining electricity quantity of the energy storage unit 400 in real time, and presets the power-supply threshold, for example, to 5% of a capacity of the energy storage unit 400. When the electricity quantity of the energy storage unit 400 is less than the power-supply threshold, the terminal device is automatically switched to the second state to supply power to the first functional unit group 200, enable the second functional unit group 300 to enter a standby state or run with low power consumption, disconnect the branch of the energy storage unit 400, and prompt the user to use the emergency power supply unit 500 to supply power to the terminal device such that the user can use a function such as emergency call when the terminal device has a low electricity quantity or is out of power, thereby improving reliability of the terminal device.

2. Manual Switching

When the user finds that a remaining electricity quantity of the energy storage unit 400 is lower than a psychologically-expected electricity quantity, for example, even if there is no emergency call, some users also consider that the electricity quantity is insufficient to use when the remaining electricity quantity is less than 50%, in this case, the user may choose manual switching, manually switches the terminal device to the second state, and uses the emergency power supply unit 500 to supply power to the terminal device, thereby improving an endurance capability of the terminal device.

When the user can flexibly set the power-supply threshold to meet different requirements, a vendor may also preset, at delivery, a power-supply threshold corresponding to an electricity quantity requirement required by call in a limiting case.

That the user manually switches a working status of the terminal device may include a voice instruction, a touch key and physical key switching operation. This is not limited herein.

When an electricity quantity of the terminal device in the second state can be supplemented using a charger or a mobile power supply, when the electricity quantity of the energy storage unit 400 reaches the power-supply threshold, the terminal device may be switched to a first working state such that the terminal device recovers to a normal working state, that is, supplies power to the first functional unit group 200 and the second functional unit group 300.

Power supply modes in different modes are used such that the device can be adapted to a plurality of working occasions. When the energy storage unit 400 cannot supply power, the emergency power supply unit 500 is used for power supply, in addition, the control unit 100 flexibly supplies power to the first functional unit group 200 and the second functional unit group 300 such that it is ensured that the device preferentially supplies power to the first functional unit group 200 in an emergency, thereby meeting a use requirement of the user.

For ease of understanding the technical solution of this application, an application scenario is provided now for explanation and described below.

When the energy storage unit 400 of the terminal device is out of power or has an electricity quantity less than the power-supply threshold for normal work, the control unit 100 controls, using a control bus, the voltage-transformation and power-switching unit 600 to disconnect a power supply branch of the energy storage unit 400 and controls the voltage-transformation and power-switching unit 600 to be switched to an emergency power supply branch. The terminal device enters an emergency call system state. The control unit 100 controls the emergency power supply unit 500 to supply power to the first functional unit group 200 and enable the second functional unit group 300 to enter a standby state. The user performs friction on or shakes the terminal device to generate power. Electric energy is converted by the power conversion module 700 and then is input into the electric energy cache unit for cache. Then, a stable current is used by the terminal device.

The control unit 100 adjusts the display screen to a lowest power consumption working state using a standby control bus. The user enters emergency contact information using a button or a display screen, or triggers preset emergency contact information, or enters voice emergency contact information using a sensor, and sends the emergency contact information to the control unit 100.

The control unit 100 obtains the emergency contact information using a data bus, and sends the emergency contact information to a wireless communications unit using the data bus. The wireless communications unit wirelessly sends the emergency contact information to a base station. The control unit 100 may also obtain, using the data bus according to a requirement, information such as a location of the user obtained by the GPS module of the first functional unit group 200.

After the base station receives the emergency contact information, the base station is responsible for setting up a call link to an emergency contact.

After the emergency call link is set up, the user may input or output related call information using the first functional unit group 200 of the terminal device in order to implement an emergency call service function. After an emergency call is completed, the control unit 100 may disconnect a communication link of the first functional unit group 200 such that the terminal device enters an emergency call standby state to wait a subsequent rescue activity.

Figure 2:
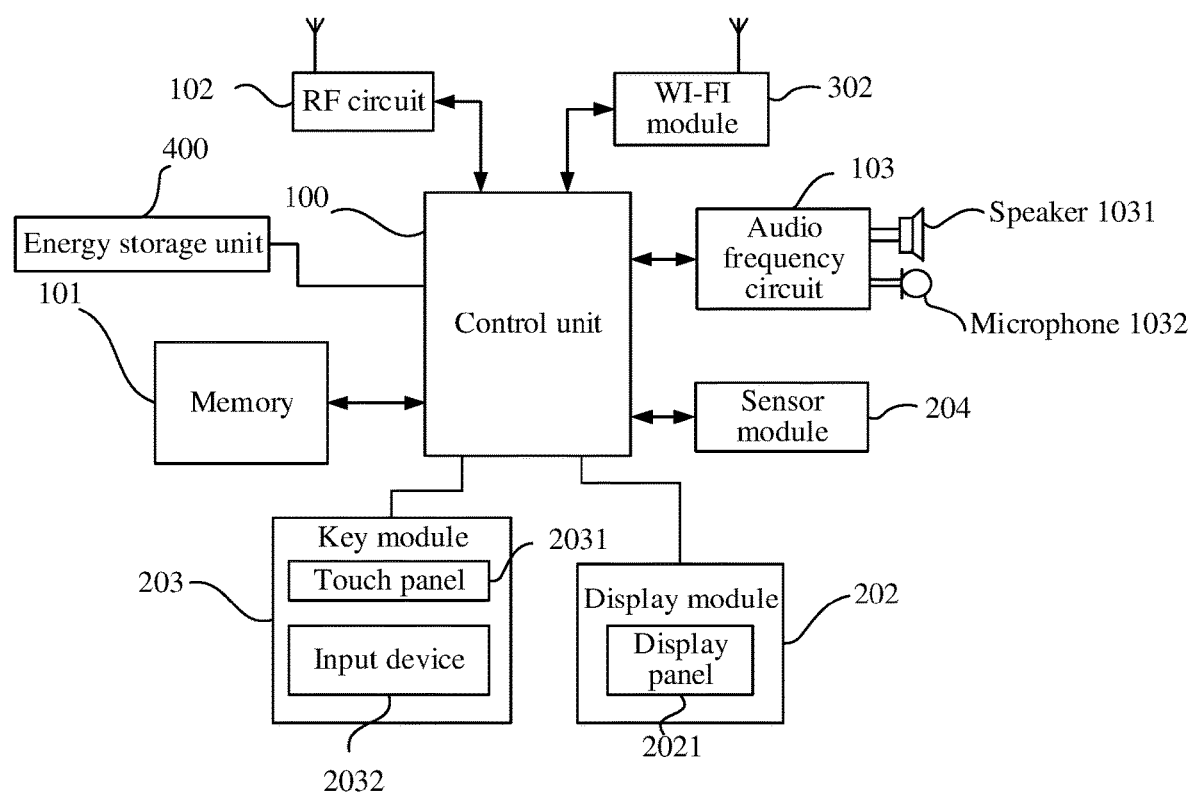
FIG. 2 is a structural diagram of another embodiment of a terminal device according to the present disclosure.

As shown in FIG. 2, for ease of description, FIG. 2 only shows a part related to the embodiments of the present disclosure. For a specific technical detail not disclosed, refer to a method part in the embodiments of the present disclosure. The terminal may include any terminal device such as a mobile phone, a tablet computer, a PDA, a POS, and a vehicle-mounted computer. For example, the terminal is a mobile phone.

FIG. 2 is a block diagram of a partial structure of a mobile phone related to a terminal according to an embodiment of the present disclosure. Referring to FIG. 2, the mobile phone includes components such as a radio frequency (RF) circuit 102, a memory 101, a key module 203, a display module 202, a sensor module 204, an audio frequency circuit 103, a WI-FI module 302, a control unit 100, and an energy storage unit 400. A person skilled in the art may understand that the structure of the mobile phone shown in FIG. 2 does not constitute a limitation to the mobile phone, and the mobile phone may include more components or fewer components than those shown in the figure, or some components may be combined, or a different component deployment may be used.

The following describes the components of the mobile phone with reference to FIG. 2.

The RF circuit 102 may be configured to receive and send a signal during an information receiving and sending process or a call process. Particularly, after receiving downlink information from a base station, the RF circuit 102 sends the downlink information to the control unit 100 for processing. In addition, the RF circuit 102 sends related uplink data to the base station. Usually, the RF circuit 102 includes, but is not limited to, an antenna, at least one amplifier, a transceiver, a coupler, a low noise amplifier (LNA), a duplexer, and the like. In addition, the RF circuit 102 may further communicate with a network and another device through wireless communication. The wireless communication may use any communications standard or protocol, which includes, but is not limited to, GSM, GPRS, Code Division Multiple Access (CDMA), Wideband CDMA (WCDMA), Long Term Evolution (LTE), electronic mail (e-mail), a short message service (SMS), and the like.

The memory 101 may be configured to store a software program and module. The control unit 100 runs the software program and module stored in the memory 101 to implement various functional applications and data processing of the mobile phone. The memory 101 may mainly include a program storage area and a data storage area. The program storage area may store an operating system, an application program required by at least one function (such as a sound playback function and an image display function), and the like. The data storage area may store data (such as audio data and an address book) created based on use of the mobile phone, and the like. In addition, the memory 101 may include a high-speed random access memory (RAM), and may further include a non-volatile memory, such as at least one magnetic disk storage device, a flash storage device, or another volatile solid-state storage device.

The key module 203 may be configured to receive input digit or character information, and generate a keyboard signal input related to user setting and function control of the mobile phone. Further, the key module 203 may include a touch panel 2031 and an input device 2032. The touch panel 2031, also referred to as a touchscreen, may collect a touch operation of a user on or near the touch panel 2031 (such as an operation of a user on the touch panel 2031 or near the touch panel 2031 using any suitable object or accessory such as a finger or a stylus), and drive a corresponding connection apparatus based on a preset program. Optionally, the touch panel 2031 may include two parts, a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the control unit 100. Moreover, the touch controller can receive and execute a command sent by the control unit 100. In addition, the touch panel 2031 may be implemented into a plurality of types such as a resistive, capacitive, infrared, or surface acoustic wave type touch panel. In addition to the touch panel 2031, the key module 203 may further include the input device 2032. Further, the input device 2032 may include, but is not limited to, one or more of a physical keyboard, a functional key (such as a volume control key or a switch key), a track ball, a mouse, a joystick, and the like.

The display module 202 may be configured to display information input by the user or information provided for the user, and various menus of the mobile phone. The display module 202 may include a display panel 2021. Optionally, the display panel 2021 may be configured using a form such as a liquid crystal display (LCD), or an organic light-emitting diode (OLED). Further, the touch panel 2031 may cover the display panel 2021. After detecting the touch operation on or near the touch panel 2031, the touch panel 2031 transfers the touch operation to the control unit 100 to determine a type of a touch event. Then, the control unit 100 provides corresponding visual output on the display panel 2021 based on the type of the touch event. Although, in FIG. 2, the touch panel 2031 and the display panel 2021 are used as two separate parts to implement input and input functions of the mobile phone, in some embodiments, the touch panel 2031 and the display panel 2021 may be integrated to implement the input and output functions of the mobile phone.

The mobile phone may further include at least one sensor module 204 such as an optical sensor, a motion sensor, and other sensors. Further, the optical sensor may include an ambient light sensor and a proximity sensor. The ambient light sensor may adjust luminance of the display panel 2021 based on brightness of ambient light. The proximity sensor may switch off the display panel 2021 and/or backlight when the mobile phone is moved to the ear. As one type of motion sensor, an acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio frequency circuit 103, a speaker 1031, and a microphone 1032 may provide an audio interface between the user and the mobile phone. The audio frequency circuit 103 may convert received audio data into an electric signal and transmit the electric signal to the speaker 1031. The speaker 1031 converts the electric signal into a sound signal for output. On the other hand, the microphone 1032 converts a collected sound signal into an electric signal. The audio frequency circuit 103 receives the electric signal and converts the electric signal into audio data, and outputs the audio data to the control unit 100 for processing. Then, the control unit 100 sends the audio data to, for example, another mobile phone using the RF circuit 102, or outputs the audio data to the memory 101 for further processing.

WI-FI is a short distance wireless transmission technology. The mobile phone may help, using the WI-FI module 302, the user to receive and send an e-mail, browse a web page, access streaming media, and so on. WI-FI provides wireless broadband Internet access for the user. Although FIG. 2 shows the WI-FI module 302, it may be understood that the WI-FI module 302 is not a necessary component of the mobile phone, and when required, the WI-FI module 302 may be omitted as long as the scope of the essence of the present disclosure is not changed.

The control unit 100 is a control center of the mobile phone, and connects parts of the mobile phone using various interfaces and lines. By running or executing the software program and/or module stored in the memory 101, and invoking data stored in the memory 101, the control unit 100 performs various functions and data processing of the mobile phone, thereby performing overall monitoring on the mobile phone. Optionally, the control unit 100 may include one or more processing units. Preferably, the control unit 100 may integrate an application processor and a modem processor. The application processor mainly processes an operating system, a user interface, an application program, and the like. The modem processor mainly processes wireless communication. It may be understood that the modem processor may not be integrated into the control unit 100.

Although not shown, the mobile phone may further include a camera and the like, and details are not described herein.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

A person of ordinary skill in the art may understand that all or some of the steps of the methods in the embodiments may be implemented by a program instructing relevant hardware. The program may be stored in a computer-readable storage medium. The storage medium may include a read-only memory (ROM), a RAM, a magnetic disk, an optical disc, or the like.

A person of ordinary skill in the art may understand that all or some of the steps of the methods in the embodiments may be implemented by a program instructing relevant hardware. The program may be stored in a computer-readable storage medium. The storage medium mentioned above may include a ROM, a magnetic disk, an optical disc, or the like.

The terminal device provided in the present disclosure is described in detail above. A person of ordinary skill in the art could make alterations to the specific implementation and application scope based on the idea of the embodiments of the present disclosure. In sum, the content of the specification should not be construed as a limit to the present disclosure.

What is claimed is:
1. A terminal device, comprising:
a first functional circuit group configured to implement a mobile communication function;
a second functional circuit group configured to implement a non-mobile communication function;
an energy storage device coupled to the first functional circuit group and the second functional circuit group;
an emergency power supply device coupled to the first functional circuit group;
a memory comprising instructions; and
a processor coupled to the memory, the energy storage device, the emergency power supply device, the first functional circuit group, and the second functional circuit group, wherein the instructions cause the processor to be configured to:
  detect an electricity quantity of the energy storage device;
  preset, based on user instruction, a power-supply threshold as a percentage of a capacity of the energy storage device in response to detecting the electricity quantity;
  determine whether the electricity quantity of the energy storage device is in a first state or a second, wherein the first state is that the electricity quantity is greater than or equal to the power-supply threshold, wherein the second state is that the electricity quantity is less than the power-supply threshold, wherein the energy storage device supplies a first amount of power to the terminal device during the first state, wherein the emergency power supply device supplies a second amount of power to the terminal device during the second state, and wherein the second amount of power is less than the first amount of power;
  in response to the terminal device entering the first state, control the energy storage device to provide the first amount of power to each of the first functional circuit group and the second functional circuit group; and
  in response to the terminal device entering the second state:
    control the energy storage device to be switched off; and
    control the emergency power supply device to:
      provide the second amount of power to a component of the first functional circuit group so as to implement the mobile communication function; and
      provide the second amount of power to the second functional circuit group so as to operate the second functional circuit group in a standby state.

2. The terminal device of claim 1, wherein the first functional circuit group comprises at least one of a communications circuit, a sensor circuit, a Global Positioning System (GPS) circuit, a display, or a key circuit, and wherein the second functional circuit group comprises at least one of a BLUETOOTH low energy (BLE) circuit or a WI-FI circuit.

3. The terminal device of claim 1, wherein the emergency power supply device comprises a power generation circuit and a power conversion circuit, wherein the power conversion circuit is electrically coupled to the power generation circuit, wherein the power generation circuit is configured to generate electric energy, and wherein the power conversion circuit is configured to convert the electric energy generated by the power generation circuit into a working voltage of the terminal device.

4. The terminal device of claim 3, wherein a voltage-transformation and a power-switching circuit is disposed between the processor and the energy storage device, wherein the voltage-transformation and the power-switching circuit is electrically coupled to the power conversion circuit, and wherein the instructions further cause the processor to be configured to:
  control the voltage-transformation and the power-switching circuit to switch on the energy storage device and switch off the power conversion circuit to disconnect a branch in which the emergency power supply device is located in response to the terminal device entering the first state; and
  control the voltage-transformation and the power-switching circuit to switch off the energy storage device and switch on the power conversion circuit in response to the terminal device entering the second state.

5. The terminal device of claim 3, wherein the power generation circuit comprises at least one of a solar cell panel component, a vibration power-generating component, a friction power-generating component, or a thermal-energy component.

6. The terminal device of claim 4, wherein the power conversion circuit comprises an electric energy cache circuit coupled to the voltage-transformation and the power-switching circuit, and wherein the electric energy cache circuit is configured to cache the electric energy generated by the power generation circuit.

7. The terminal device of claim 1, wherein the processor is further configured to control the second functional circuit group to enter a low power consumption state in response to the terminal device entering the second state, and wherein the low power consumption state comprises the standby state.

8. The terminal device of claim 1, wherein when the terminal device enters the second state, the processor is further configured to control the second functional circuit group to enter a low power consumption state in the second state of the terminal device, and wherein the low power consumption state comprises an off state.

9. The terminal device of claim 1, wherein the power-supply threshold comprises a lowest electricity quantity required to maintain work of the terminal device.

10. The terminal device of claim 1, wherein the terminal device is a smartphone.

11. The terminal device of claim 1, wherein the terminal device is a tablet computer.

12. The terminal device of claim 1, wherein the terminal device is a wearable device.

13. A non-transitory computer readable medium storing at least one program code for controlling power supply in a terminal device which when executed by a processor of the terminal device causes the processor to:
  detect an electricity quantity of an energy storage device;
  preset, based on user instruction, a power-supply threshold as a percentage of a capacity of the energy storage device in response to detecting the electricity quantity;
  determine whether the electricity quantity in the energy storage device is in a first state or a second state, wherein the terminal device comprises a first functional circuit group, a second functional circuit group, the energy storage device and an emergency power supply device, wherein the first state is that the electricity quantity is greater than or equal to the power-supply threshold, wherein the second state is that the electricity quantity is less than the power-supply threshold, wherein the energy storage device supplies a first amount of power to the terminal device during the first state, wherein the emergency power supply device supplies a second amount of power to the terminal device during the second state, and wherein the second amount of power is less than the first amount of power;
  in response to the terminal device entering the first state, control the energy storage device to provide the first amount of power to the first functional circuit group and the second functional circuit group, wherein the first functional circuit group is configured to implement a mobile communication function of the terminal device and the second functional circuit group is configured to implement a non-mobile communication function of the terminal device; and in response to the terminal device entering the second state:

control the energy storage device to be switched off; and control the emergency power supply device to:

provide the second amount of power to a component of the first functional circuit group so as to implement the mobile communication function; and provide the second amount of power to the second functional circuit group so as to operate the second functional circuit group in a standby state.

14. The non-transitory computer readable medium of claim 13, wherein the first functional circuit group comprises at least one of a communications circuit, a sensor circuit, a Global Positioning System circuit, a display, or a key circuit, and wherein the second functional circuit group comprises at least one of a BLUETOOTH low energy circuit or a WI-FI circuit.

15. The non-transitory computer readable medium of claim 13, wherein the at least one program code further causes the processor to be configured to control the second functional circuit group to enter a low power consumption state in response to the terminal device entering the second state, and wherein the low power consumption state comprises the standby state.

16. The non-transitory computer readable medium of claim 13, wherein the terminal device enters the second state, and wherein the at least one program code further causes the processor to be configured to control the second functional circuit group to enter a low power consumption state in the second state of the terminal device, and wherein the low power consumption state comprises an off state.

17. The non-transitory computer readable medium of claim 13, wherein the emergency power supply device comprises a power generation circuit electrically coupled to a power conversion circuit, wherein the power generation circuit is configured to generate electric energy, and wherein the power conversion circuit is configured to convert the electric energy generated by the power generation circuit into a working voltage of the terminal device.

18. The non-transitory computer readable medium of claim 17, wherein the power generation circuit comprises at least one of a solar cell panel component, a vibration power-generating component, a friction power-generating component, or a thermal-energy component.

19. The non-transitory computer readable medium of claim 17, wherein a voltage-transformation and power-switching circuit are disposed between the processor and the energy storage device, wherein the voltage-transformation and power-switching circuit are electrically coupled to the power conversion circuit, and wherein the at least one program code further causes the processor to be configured to:

control the voltage-transformation and power-switching circuit to switch on the energy storage device and switch off the power conversion circuit to disconnect a branch in which the emergency power supply device is located in response to the terminal device entering the first state; and control the voltage-transformation and power-switching circuit to switch off the energy storage device and switch on the power conversion circuit in response to the terminal device entering the second state.

20. The non-transitory computer readable medium of claim 19, wherein the power conversion circuit comprises an electric energy cache circuit coupled to the voltage-transformation and power-switching circuit, and wherein the electric energy cache circuit is configured to cache the electric energy generated by the power generation circuit.

* * * * *